(12) United States Patent
Gao et al.

(10) Patent No.: US 8,130,458 B2
(45) Date of Patent: Mar. 6, 2012

(54) BPM RECORDING WITH MORE THAN ONE DOT PER BIT

(75) Inventors: Kaizhong Gao, Eden Prairie, MN (US); Housan Dakroub, Dearborn Heights, MI (US)

(73) Assignee: Seagate Technology LLC, Scotts Valley, CA (US)

( * ) Notice: Subject to any disclaimer, the term of this patent is extended or adjusted under 35 U.S.C. 154(b) by 120 days.

(21) Appl. No.: 12/539,147

(22) Filed: Aug. 11, 2009

(65) Prior Publication Data
US 2011/0038072 A1  Feb. 17, 2011

(51) Int. Cl.
*G11B 20/14* (2006.01)
*G11B 20/16* (2006.01)
*G11B 5/09* (2006.01)

(52) U.S. Cl. .................................. 360/40; 360/48
(58) Field of Classification Search .................. None
See application file for complete search history.

(56) References Cited

U.S. PATENT DOCUMENTS

| 6,738,207 | B1 | 5/2004 | Belser et al. | |
|---|---|---|---|---|
| 6,754,017 | B2 | 6/2004 | Rettner et al. | |
| 7,133,229 | B2 | 11/2006 | Semba | |
| 7,324,294 | B2 | 1/2008 | Moser | |
| 7,580,210 | B2 * | 8/2009 | Choi | 360/31 |
| 7,848,041 | B2 * | 12/2010 | Takeo | 360/53 |
| 2008/0002269 | A1 | 1/2008 | Sakurai et al. | |

* cited by examiner

*Primary Examiner* — Daniell L Negron
(74) *Attorney, Agent, or Firm* — Fellers, Snider, et al

(57) ABSTRACT

Data storage systems are provided. Data storage systems illustratively include a recording head having a writing element and a bit patterned medium having a plurality of media dots. In some embodiments, the plurality of media dots pass the recording head at a media dot frequency. In some embodiments, the writing element writes data to the bit patterned media at a writing frequency that is less than the media dot frequency.

13 Claims, 10 Drawing Sheets

BPM RECORDING WITH MORE THAN ONE DOT PER BIT

BACKGROUND

In hard disc drives, recording heads commonly write to a continuous magnetic layer on the surface of recording media. In these drives, the synchronization or timing of the recording head writing process relative to the rotation or position of the recording media has a relatively large margin of error. For example, if the writing process is a little early or a little late in its timing relative to the disc rotation, the information intended to be written may still be recoverable during the reading process. However, in hard disc drives or other storage devices with bit patterned media, synchronization of the writing process relative to the rotation or positioning of the recording media becomes less tolerant of errors.

In bit patterned media, the surfaces of the recording media have individual, discrete media dots made of magnetic materials. These media dots are surrounded by and separated from each other by nonmagnetic materials. In the case of writing to bit patterned media, the synchronization of the writing process relative to recording media becomes more critical. For example, if the writing process is too early or too late, the writer may not write to the intended media dot or even to any media dot at all. In this situation, the information that was intended to be written may not be recoverable during the reading process.

SUMMARY

Data storage systems are provided. The data storage systems illustratively include a recording head having a writing element and a bit patterned medium having a plurality of media dots. In some embodiments, the plurality of media dots pass the recording head at a media dot frequency. In some embodiments, the writing element writes data to the bit patterned media at a writing frequency that is less than the media dot frequency.

DETAILED DESCRIPTION

Figure 1:
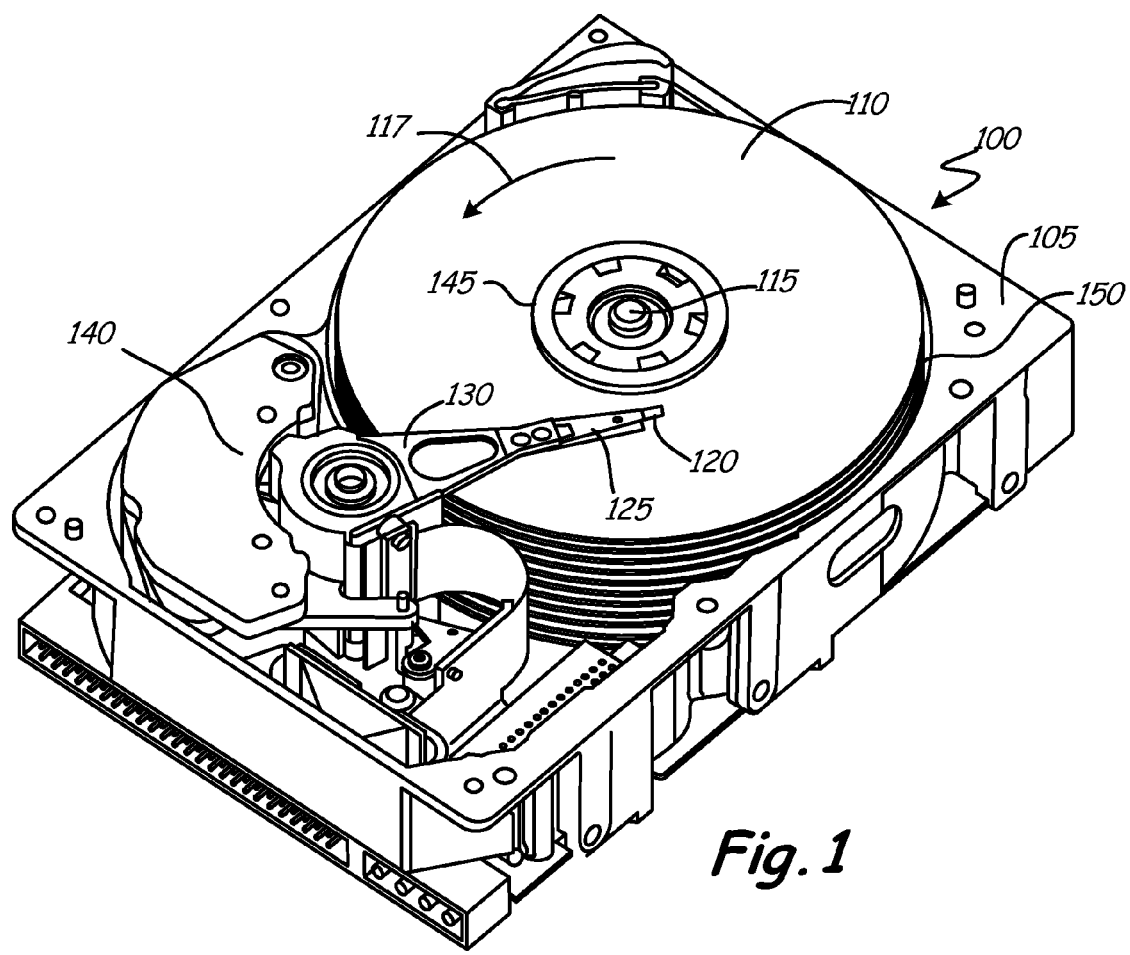
FIG. 1 is a perspective view of one embodiment of a data storage device.

FIG. 1 is a perspective view of a hard disc drive 100. Drive 100 is an example of a device in which some embodiments of the present disclosure may be incorporated. Hard disc drives are a common type of data storage system. While embodiments of this disclosure are described in terms of disc drives, other types of data storage systems should be considered within the scope of the present disclosure.

Disc drive 100 includes an enclosure 105. Disc drive 100 further includes a disc or medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in a path between a disc inner diameter 145 and a disc outer diameter 150.

Figure 2:
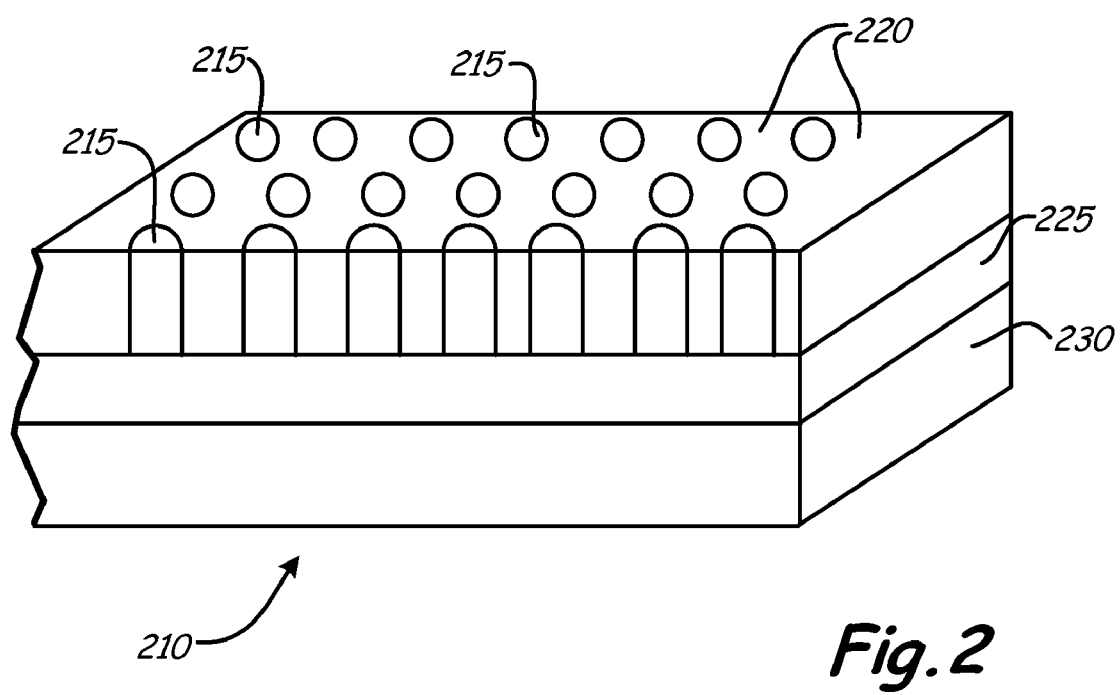
FIG. 2 is a simplified perspective view of a bit patterned data recording medium.

FIG. 2 is a simplified perspective view of a bit patterned medium 210. Medium 210 is illustratively a medium in a disc drive such as medium 110 in FIG. 1. Certain embodiments disclosed herein may be practiced with bit patterned media such as medium 210. Implementation with types and variations of bit patterned media other than the simplified variation shown in FIG. 2 are also within the scope of the present disclosure. Medium 210 includes a plurality of media dots 215. Dots 215 are illustratively made from a magnetic material or materials. Dots 215 are separated from each other by a non-magnetic layer 220. Medium 210 also includes a soft magnetic underlayer 225 and a substrate 230.

Figure 3:
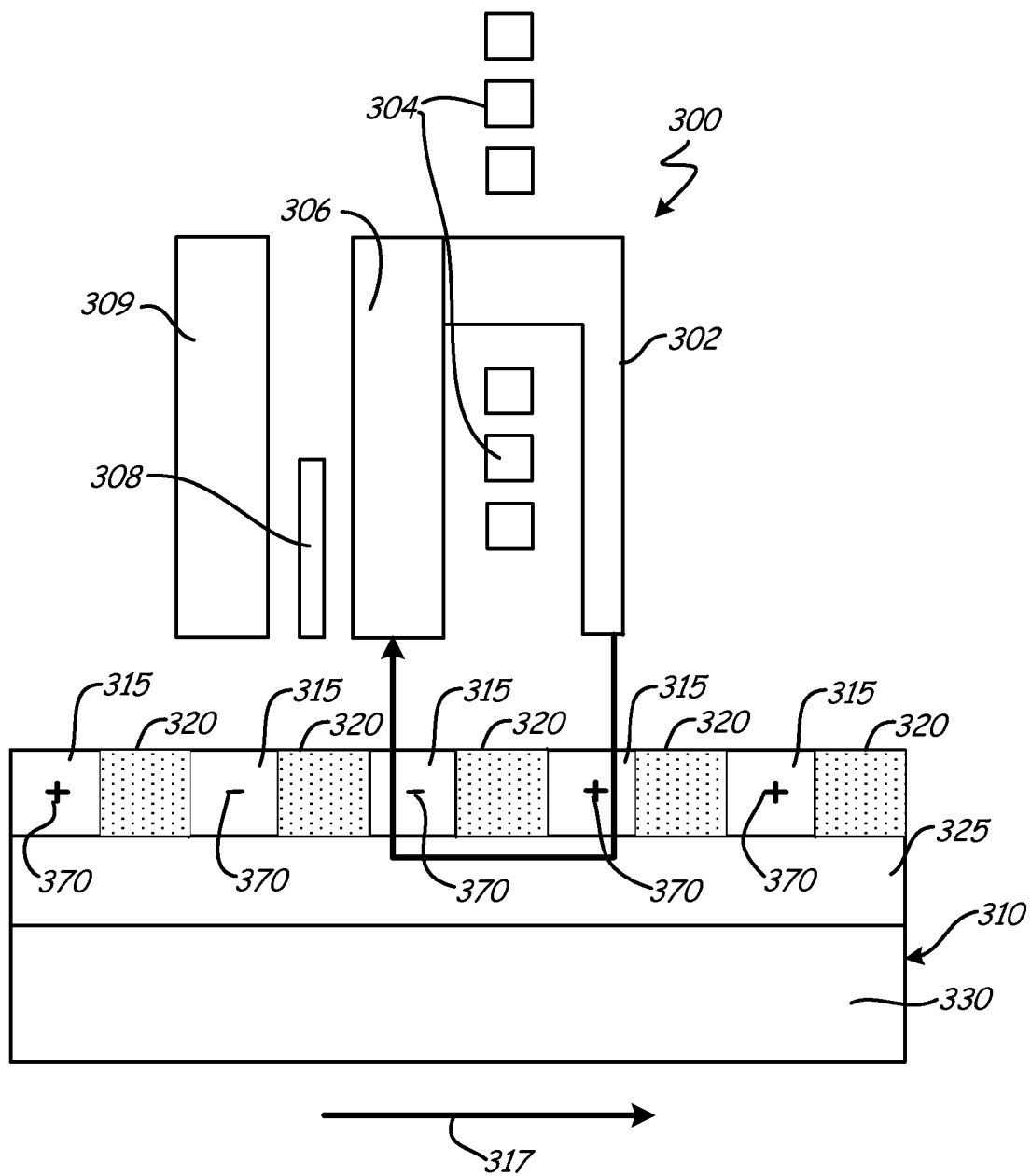
FIG. 3 is a schematic diagram of a cross-section of a recording head writing to a bit patterned data recording medium.

FIG. 3 is a schematic diagram of a cross-section of a recording head 300 writing to a bit patterned medium 310. Recording head 300 is illustratively carried by a slider such as slider 120 in FIG. 1, and bit patterned medium 310 is illustratively a storage medium such as medium 110 in FIG. 1 and medium 210 in FIG. 2. FIG. 3 is a simplified diagram only showing cross-sectional views of some of the read and write components of a recording head. Those skilled in the art will recognize recording heads commonly include other components. Some embodiments of the present disclosure may be practiced with recording heads such as recording head 300. Embodiments of the present disclosure are however not limited to such recording heads. Many various types of recording heads are known in the art, and embodiments of the present disclosure are not limited to any specific type of recording head. Embodiments of the present disclosure are practiced in all types of recording heads.

Recording head 300 includes a write pole 302, a magnetization coil 304, a return pole 306, a read element 308, and a bottom shield 309. Storage medium 310 includes media dots 315 that are illustratively media dots such as dots 215 in FIG. 2, a non-magnetic layer 320 that is illustratively a non-magnetic layer such as layer 220 in FIG. 2, a soft magnetic underlayer 325 that is illustratively an underlayer such a underlayer 225 in FIG. 2, and a substrate 330 that is illustratively a substrate such as substrate 230 in FIG. 2. Storage medium 310 rotates in the direction shown by arrow 317. Arrow 317 is illustratively a direction of rotation such as arrow 117 in FIG. 1.

In one embodiment, electric current is passed through coil 304 to generate a magnetic field. The magnetic field passes from write pole 302, through media dots 315, into underlayer 325, and across to return pole 306. The polarity of the magnetic field is illustratively reversed by reversing the polarity of the electric current passed through coil 304. The magnetic field and its polarity illustratively record a magnetization direction to media dots 315. Magnetization directions of dots 315 are represented by the "+" and "−" signs 370.

Figure 4A:
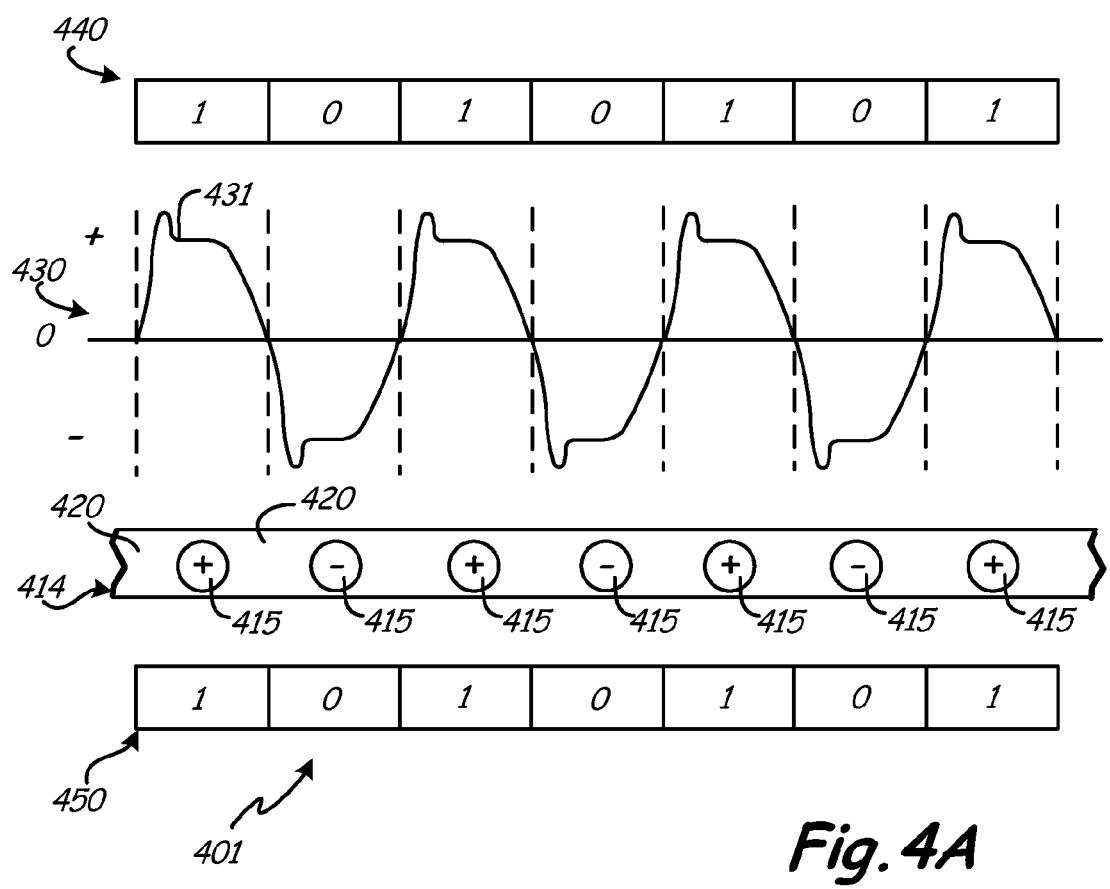
FIGS. 4A and 4B are schematic diagrams of synchronized bit patterned media writing processes.

FIG. 4A is a schematic diagram of a synchronized bit patterned media writing process 401. FIG. 4A includes a recording medium track 414 that includes media dots 415 and a non-magnetic layer 420. Track 414 is illustratively a track of media dots in a medium such as medium 210 in FIG. 2 and medium 310 in FIG. 3. Track 414 is illustratively rotated beneath a recording head in a writing process such as the process shown in FIG. 3.

FIG. 4A also includes a representation of a recording head writer magnetic field 430. Field 430 includes an intensity or amplitude 431. Amplitude 431 has an associated polarity represented by the vertical axis. Amplitudes above the center or zero line have a positive polarity and those below the center line have a negative polarity. Magnetic field 430 is illustratively a magnetic field generated by a recording head writer as track 414 and its media dots are rotated beneath the recording head. In FIG. 4A, magnetic field 430 is aligned to track 414 in the vertical direction such that field 430 represents the magnetic field generated as the portion of track 414 that is immediately below it in the vertical direction passes beneath the recording head.

FIG. 4A further includes a writer bit block 440 and a medium bit block 450. Writer bit block 440 represents the value of the binary bit that the writer intends on or is attempting to write. In the figure, magnetic field 430 is aligned in the vertical direction to writer bit block 440 such that the binary values shown in block 440 (i.e. "1 0 1 0 1 0 1") correspond to the intensity and the polarity of magnetic field 430.

Medium bit block 450 represents the values of the binary bits associated with the magnetization directions of media dots 415. These values are aligned in the vertical direction with their associated dots 415. For example, in FIG. 4A, medium bit block 450 includes seven binary values "1 0 1 0 1 0 1." These values are each aligned in the vertical direction to a media dot and correspond to the magnetization direction of the media dot (i.e. the media block binary values "1 0 1 0 1 0 1" respectively correspond to the media dot magnetization directions of "+−+−+−+").

Figure 4B:
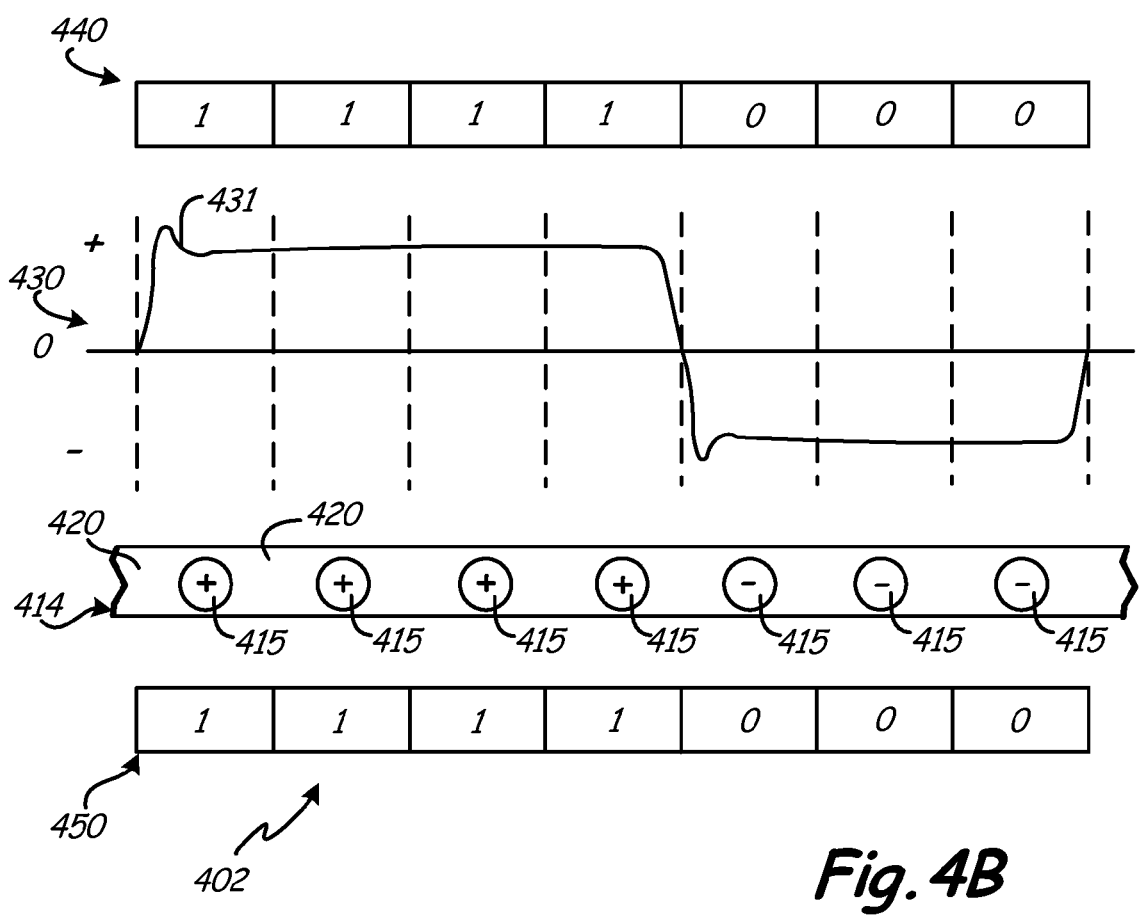

FIG. 4B is a schematic diagram of another example of a synchronized bit patterned media writing process 402. FIG. 4B includes similar elements as FIG. 4A and is numbered accordingly. Process 402 differs from process 401 in FIG. 4A in that it is writing and recording a different sequence of binary values. In process 401, the sequence of "1 0 1 0 1 0 1" is being written and recorded, and in process 402, the sequence of "1 1 1 1 0 0 0" is being written and recorded.

Processes 401 and 402 are examples of synchronized bit patterned media recording processes. In both processes, the writer is or is attempting to write seven binary values to seven media dots. This requires that the recording head generate the correct or at least an acceptable magnetic field while each media dot is in the correct position or approximately correct position beneath the recording head. If the timing or synchronization of the process is too early or too late, the intended magnetization direction will not be recorded to the correct media dot or possibly even to any media dot. This may result in information being lost during playback.

Figure 5A:
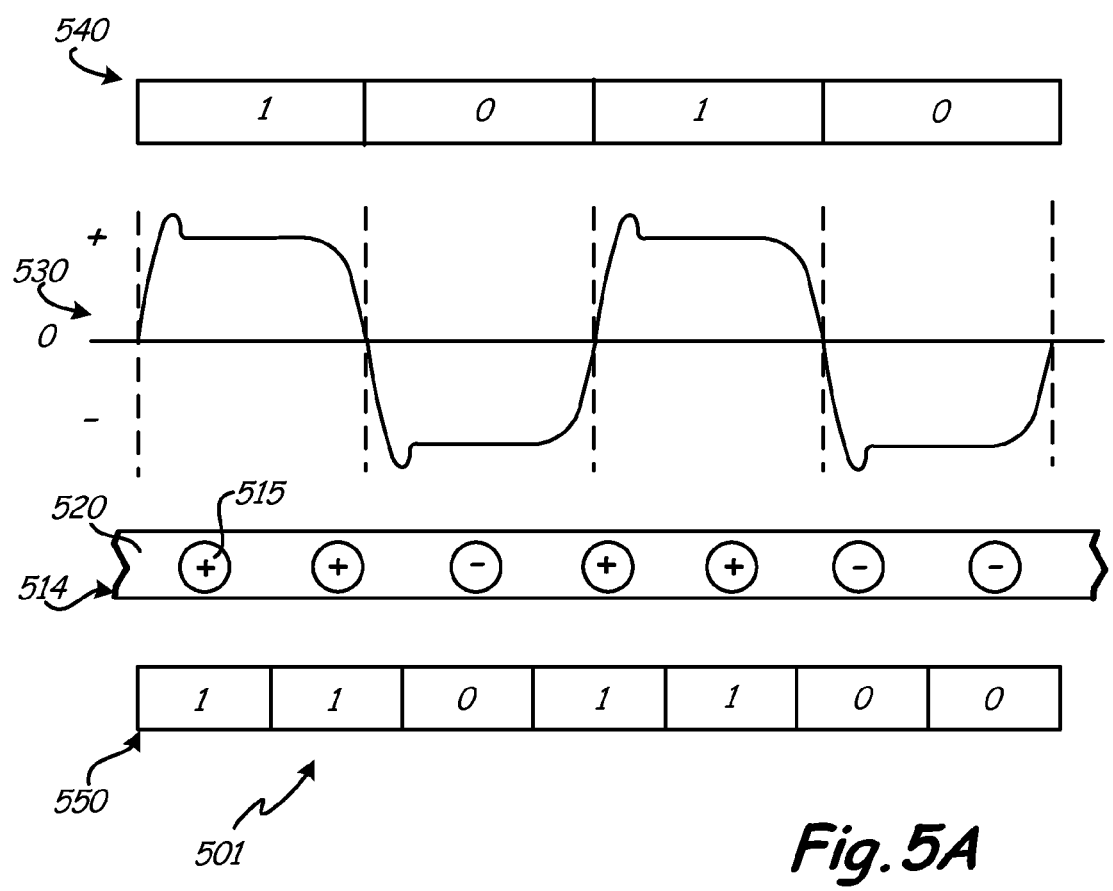
FIGS. 5A and 5B are schematic diagrams of pseudo-synchronized bit patterned media writing processes.

FIG. 5A is a schematic diagram of a pseudo-synchronized bit patterned media recording processes 501. FIG. 5A includes similar elements as FIGS. 4A and 4B and is numbered accordingly. As is shown by recording head writer magnetic field 530 and writer bit block 540, the recording head is generating a magnetic field that corresponds to the four binary values "1 0 1 0." As is shown by the recording media track 514 and medium bit block 550, track 514 includes seven media dots and records magnetizations directions that correspond to the seven binary values of "1 1 0 1 1 0 0."

Figure 5B:
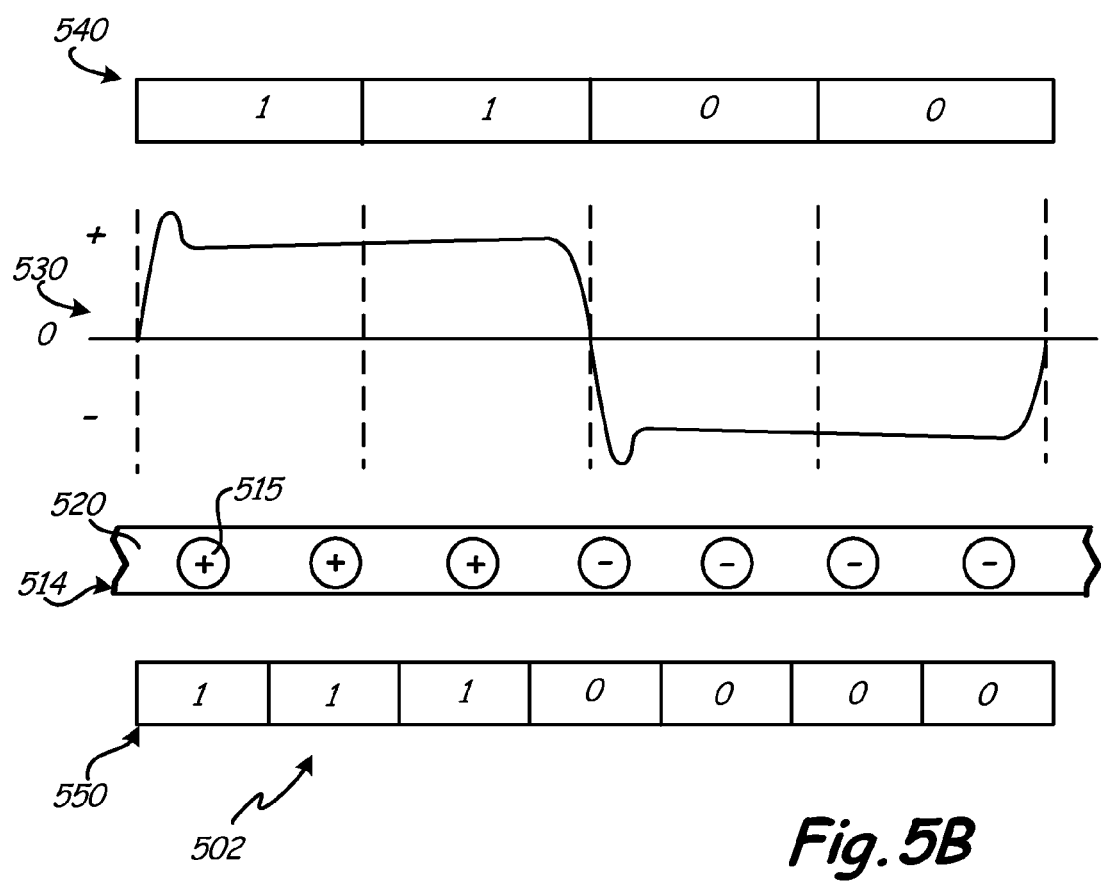

FIG. 5B is a schematic diagram of another example of a pseudo-synchronized bit patterned media writing process 502. FIG. 5B includes similar elements as FIG. 5A and is numbered accordingly. Process 502 differs from process 501 in FIG. 5A in that the writer is generating a different sequence of values, "1 1 0 0" instead of "1 0 1 0," and a different sequence of values is being recorded, "1 1 1 0 0 0 0" instead of "1 1 0 1 1 0 0."

In processes 501 and 502, there is not a one-to-one correspondence between the bits being generated by the writer and the bits being recorded by the media dots. Instead, there is a four-to-seven correspondence. For example, in the time that seven media dots rotate beneath the recording head writer, the recording head writer only generates a magnetic field or fields that correspond to four bits. Or in other words, in the recording process, the media dot frequency is higher than the writing frequency.

As a result of the higher media dot frequency, the magnetization directions recorded to the media dots will not directly correspond to the bits generated by the writer. During a playback process, the reader will recover the recorded bits (e.g. the bits in blocks 550 in FIGS. 5A and 5B) and not the bits generated by the writer (e.g. the bits in blocks 540 in FIGS. 5A and 5B).

The bits generated by the writer are however recoverable. The writer bits are illustratively recovered based upon the recorded magnetization directions, the frequency of the media dots, and the frequency of the writer. For example, in a process with a four-to-seven correspondence such as processes 501 and 502 in FIGS. 5A and 5B, one or two media dots correspond to one writer bit, three or four media dots correspond to two writer bits, five or six media dots correspond to three writer bits, and seven media dots correspond to four writer bits. For example, in FIG. 5B, the media dots have magnetization directions that correspond to the sequence of "1 1 1 0 0 0 0." According to the decoding scheme given above, three or four media dots correspond to two writer bits. This means that "1 1 1 0 0 0 0" corresponds to the writer bits of "1 1 0 0." This result is consistent with the writer bits shown in FIG. 5B represented by the writer magnetic field 530 and the bits in writer bit block 540.

Figure 6:
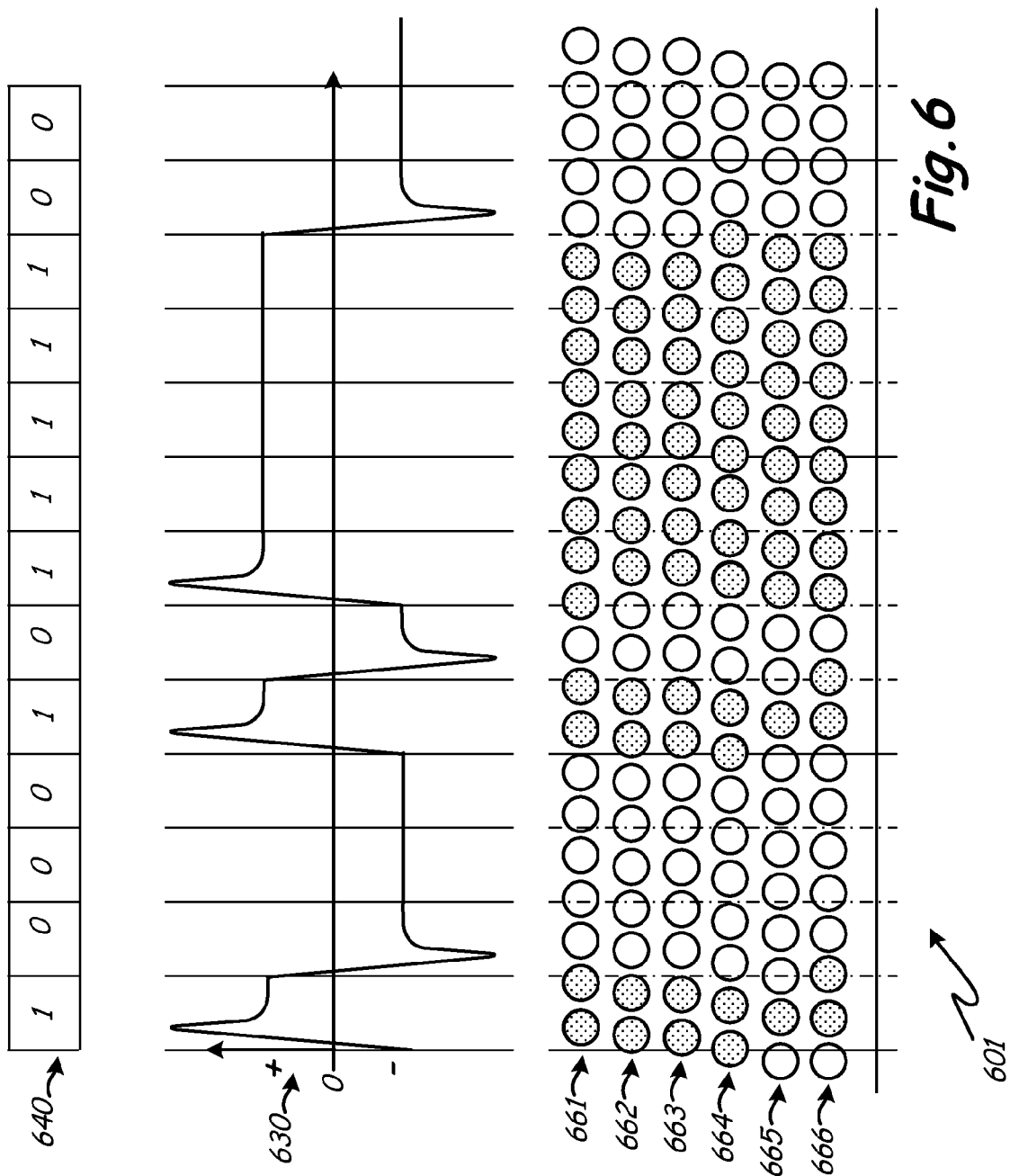
FIG. 6 is a schematic diagram of a pseudo-synchronized bit patterned media writing process illustrating various synchronization possibilities.

FIG. 6 is a schematic diagram of a pseudo-synchronized bit patterned media writing process 601. FIG. 6 includes a recording head writer magnetic field 630 and a writer bit block 640. Block 640 corresponds to field 630 and represents the value of the binary bit that the writer intends on or is attempting to write. Process 601 is illustratively a four-to-seven pseudo-synchronized process like processes 501 and 502 shown in FIGS. 5A and 5B. FIG. 6 also includes six recording medium tracks 661-666 that each includes media dots. The media dots are each color coded such that the shaded dots correspond to a positive magnetization direction (i.e. corresponding to the binary value "1") and the un-shaded dots correspond to a negative magnetization direction (i.e. corresponding to the binary value "0").

Tracks 661-666 illustratively represent different synchronization possibilities. For example, the first media dot to the left in track 666 is further to the left than the first media dot to the left in track 661. This represents that the first media dot in track 666 passes beneath the recording head writer before the first media dot in track 661 passes beneath the writer. As is shown in FIG. 6, the magnetization directions of the media dots in the tracks depend upon the synchronization. However, the writer bits shown in block 640 and represented by field 630 can be retrieved or recovered from each of the tracks using a decoding scheme such as the one described in reference to FIGS. 5A and 5B. It is also worth noting at this point, that in some embodiments of bit patterned media recording, that media dots only have two states. They can have a positive magnetization direction or a negative magnetization direction (i.e. they either correspond to a "1" or a "0"). In an embodiment, media dots have no intermediary state. This is shown for example in FIG. 6, in that the magnetization directions of all of the media dots either correspond to a "1" or a "0."

FIGS. 5A, 5B, and 6 each illustrate pseudo-synchronized writing processes with four writer bits corresponding to seven media bits (i.e. seven media dot magnetization directions). Embodiments of the present disclosure are not however limited to any particular number of writer bits to media bits ratio. Embodiments of the present disclosure include any number of writer bits corresponding to any number of media bits.

It should be noted that embodiments of the present disclosure, such as those described above, illustratively include oversampling. In oversampling, the number of media dots is greater than the number of binary bits that are being stored and retrieved. Certain embodiments include oversampling of ten percent or greater. For example, in an embodiment with ten percent oversampling, one hundred binary bits of information is stored to and retrieved from one hundred and ten media dots. This oversampling illustratively improves the ability of a bit patterned media system to recover data. For example, in a system that stores one binary bit to each media dot, data may be lost if the timing of the recording head writing process relative to the positions of the media dots is too early or too late. However, in certain embodiments of the present disclosure, oversampling is able to compensate for these timing or positional errors and data may be recovered despite timing or positional errors.

Figure 7:
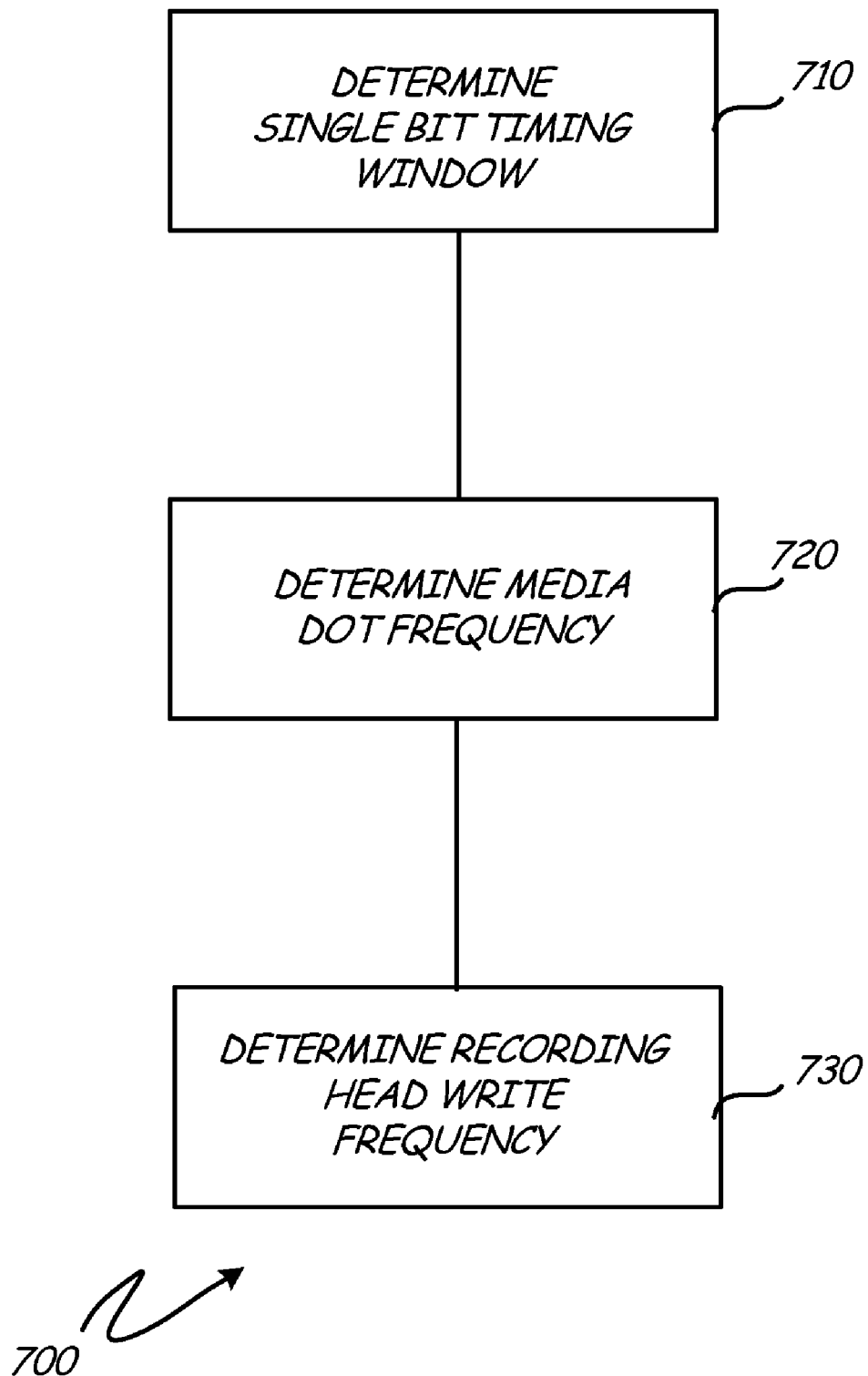
FIG. 7 is a flow diagram of a method of selecting a pseudo-synchronized writing process.

FIG. 7 is a flow diagram of an illustrative method 700 of selecting a pseudo-synchronized writing process. At step 710, the single bit timing window is determined. In a bit patterned media writing process, each media dot has an associated timing window in which a magnetic field can write to the media dot. However, depending on a number of factors such as, but not limited to, writer device properties and recording medium properties, the writer will only be able to generate a magnetic field sufficient to record a magnetization direction to a media dot for a portion of the potential timing window. This portion or fraction of the timing window is the single bit timing window. In an embodiment, this single bit timing window is determined by modeling and testing a recording process.

At step 720, the media dot frequency is determined. The media dot frequency illustratively corresponds to the number of media dots that rotate beneath a recording head writer during a writing process. The media dot frequency depends upon a number of factors such as, but not limited to, media dot shapes, distributions, and drive revolutions per a minute.

At step 730, the recording head write frequency is calculated. In one embodiment, for illustration purposes only, and not by limitation, the write frequency is based at least partially upon equation 1 below in which $f_{write}$ is the recording head write frequency, $f_{dot}$ is the media dot frequency determined at step 720, and $Window_{SBT}$ is the single bit timing window determined at step 710.

$$\frac{f_{Write}}{f_{dot}} \leq Window_{SBT} \quad \text{Equation 1}$$

For example, in processes 501 and 502 in FIGS. 5A and 5B, the ratio of writer frequency to dot frequency is 4 to 7 or 57%. Assuming that the single bit timing window for processes 501 and 502 is 60%, then the write frequency satisfies equation 1.

Figure 8:
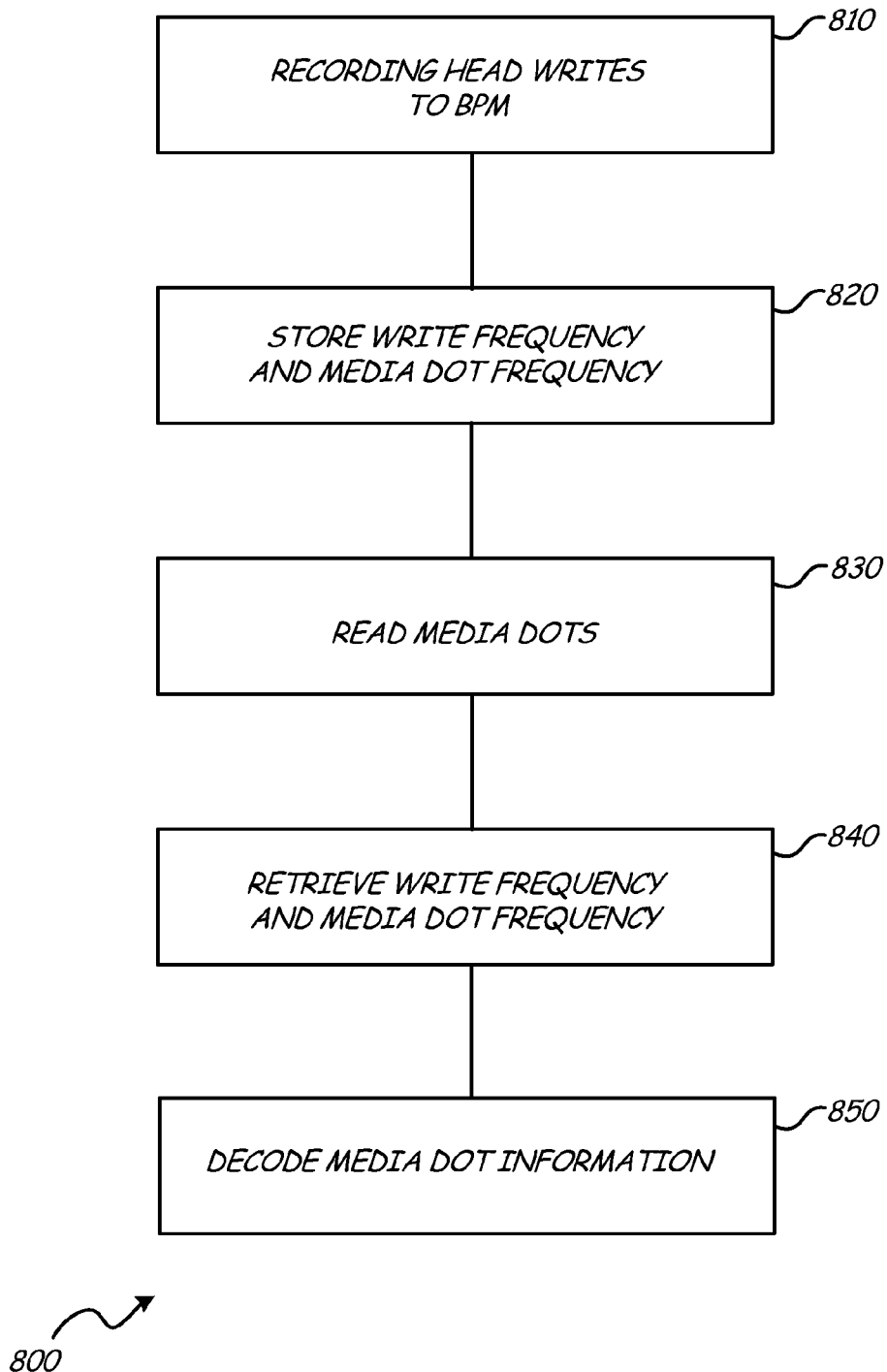
FIG. 8 is a flow diagram of a pseudo-synchronized recording and playback process.

FIG. 8 is a flow diagram of an illustrative pseudo-synchronized recording and playback process 800. At step 810, a recording head writer writes magnetization directions to media dots in a bit patterned medium. The recording head optionally writes magnetization directions at a write frequency that satisfies equation 1. At step 820, the write frequency and the media dot frequency are stored. The frequencies are stored for example, and not by limitation, in an associated flash memory device or other memory device. At step 830, the magnetization directions of the media dots are read utilizing a playback process. At step 840, the stored write and media dot frequencies are retrieved. At step 850, the media dot magnetization directions read at step 830 are decoded based at least in part on the frequencies retrieved at step 840. The media dot magnetization directions are illustratively decoded to generate data or bits that correspond to the magnetic field generated at step 810.

Embodiments of the pseudo-synchronized recording and playback process are not limited to the particular sequential ordering or of the steps in process 800. For example, for illustration purposes and not by limitation, the frequencies stored in step 820 could be stored before the writer writes magnetization directions at step 810. Also for example, in an embodiment, the frequencies retrieved in step 840 are retrieved before the magnetization directions of media dots are read in step 830.

It is worth noting some of the benefits of pseudo-synchronized recording and playback processes. In processes such as those shown in FIGS. 4A and 4B, there is a one-to-one correspondence between the writer frequency and the media dot frequency. This requires that each media dot is at an acceptable position beneath the writer. If the positioning or timing is off, the intended magnetization direction may not be correctly written. However, in pseudo-synchronized recording and playback processes, the positioning or timing of media dots and the writer is less critical. Even if the positioning or timing are off (as compared to what would be needed in one-to-one processes), the data that was intended to be recorded or stored is more capable of being recovered.

Additionally, at least some embodiments of pseudo-synchronized processes may require less intricate devices for implementation. For example, in one synchronized BPM process, an additional sensor is required to locate the position of each media dot before recording a magnetization direction to the dot. In some embodiments of pseudo-synchronized processes, the positioning of each media dot does not need to be determined by an additional sensor before recording to each dot.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A data storage system comprising:
 a bit patterned medium having a number of N media dots having a predetermined bit timing, wherein each of the N media dots is configured to have a magnetization direction that is representative of a binary value; and
 a writing element that generates a varying magnetic field to write a number M of write data bits at a predetermined write timing to the N number of media dots, is less than N and the bit timing and write timing are different and set at a predetermined ratio.

2. The data storage system of claim 1 wherein at least one of the values in the sequence of binary values is written to two media dots.

3. The data storage system of claim 1 and further comprising:
 a reading element that reads the magnetization directions of the media dots in the track; and
 a decoding circuit which decodes the magnetization directions of the N media dots to determine the M write data bits written thereto.

4. The data storage system of claim 1 in which each sequential set of M write data bits in an input data stream supplied to the writing element are written to a corresponding sequential set of N media dots on said medium along a selected track using a pseudo-synchronization write scheme.

5. The data storage system of claim 1 wherein the number M is equal to four write data bits and the number N is equal to seven media dots using a pseudo-synchronization write scheme.

6. The data storage system of claim 1 in which the respective M and N values are preselected to provide at least 10% oversampling of media dots to write data bits.

7. The data storage system of claim 1 in which the N write data bits are written across the M media dots without the use of a separate sensor to locate the first media dot of said M media dots.

8. A method comprising:
 writing N write data bits to M media dots at a fixed writer frequency using a pseudo-synchronous writing scheme where N is less than M and N/M constitutes a predetermined ratio;
 reading magnetization directions of the media dots at a variable reader frequency that is greater than the writer frequency to generate a sequence of binary values; and
 decoding the sequence of binary values to generate a representation of the N write data bits.

9. The method of claim 8 wherein the representation of the data includes fewer bits of information than the sequence of binary values.

10. The method of claim 8 and further comprising:
 storing the writer frequency; and
 retrieving the writer frequency.

11. The method of claim 8 wherein decoding the sequence of binary values is further based at least in part on a media dot frequency.

12. The method of claim 11 wherein the writer frequency is less than the media dot frequency.

13. The method of claim 12 and further comprising:
 storing the media dot frequency; and
 retrieving the media dot frequency.

* * * * *